United States Patent [19]

Hibino

[11] Patent Number: 5,444,862
[45] Date of Patent: Aug. 22, 1995

[54] CIRCUIT FOR STOPPING DATA TRANSMISSION RESPONDING TO LOW LEVEL AND RAPID FALL OF RECEIVED ELECTRIC FIELD

[75] Inventor: Kunio Hibino, Kawasaki, Japan

[73] Assignee: Fujitsu Limited, Kawasaki, Japan

[21] Appl. No.: 953,781

[22] Filed: Sep. 30, 1992

[51] Int. Cl.$^6$ .............................................. H04B 1/26
[52] U.S. Cl. .................... 455/54.1; 455/52.1; 455/67.1; 455/226.2
[58] Field of Search ............ 455/69, 54.1, 67.1, 455/115, 226.1, 226.2, 227, 229, 89, 52.1, 52.2, 52.3, 8, 9, 10, 17

[56] References Cited

U.S. PATENT DOCUMENTS

| | | | |
|---|---|---|---|
| 4,556,760 | 12/1985 | Goldman | 455/69 X |
| 4,941,200 | 7/1990 | Leslie et al. | 455/17 |
| 5,187,808 | 2/1993 | Thompson | 455/8 |
| 5,193,216 | 3/1993 | Davis | 455/67.7 |
| 5,239,666 | 8/1993 | Truby | 455/89 X |

*Primary Examiner*—Edward F. Urban
*Assistant Examiner*—Philip J. Sobutka
*Attorney, Agent, or Firm*—Armstrong, Westerman, Hattori, McLelland & Naughton

[57] ABSTRACT

A mobile radio communication apparatus containing: a transmission stopping unit for stopping the operation of transmitting a radio frequency signal when receiving a stop control signal; a first comparator for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected; a unit for obtaining and outputting a first duration in which the first condition continues; a unit for detecting a second condition in which the amplitude of the strength indicating signal decreases at a rate exceeding a predetermined decreasing rate; a unit for determining a second duration in which the operation of transmitting the second radio frequency signal is to be stopped, based on a plurality of values of the first duration, where the plurality of values are successively obtained within a predetermined duration; and a unit for generating the stop control signal, when the second condition is detected.

34 Claims, 10 Drawing Sheets

Fig. 10

CIRCUIT FOR STOPPING DATA TRANSMISSION RESPONDING TO LOW LEVEL AND RAPID FALL OF RECEIVED ELECTRIC FIELD

BACKGROUND OF THE INVENTION

1. Field of the Invention

The present invention relates to a transmission control circuit in a mobile radio communication apparatus. Conventionally, speech signals are transmitted through a narrow-band single radio channel. Recently, digital data is also transmitted through the narrow-band single radio channel. Further, the communication is often carried out between a mobile radio communication apparatus and a mobile or immobile radio communication station.

2. Description of the Related Art

Figure 1:
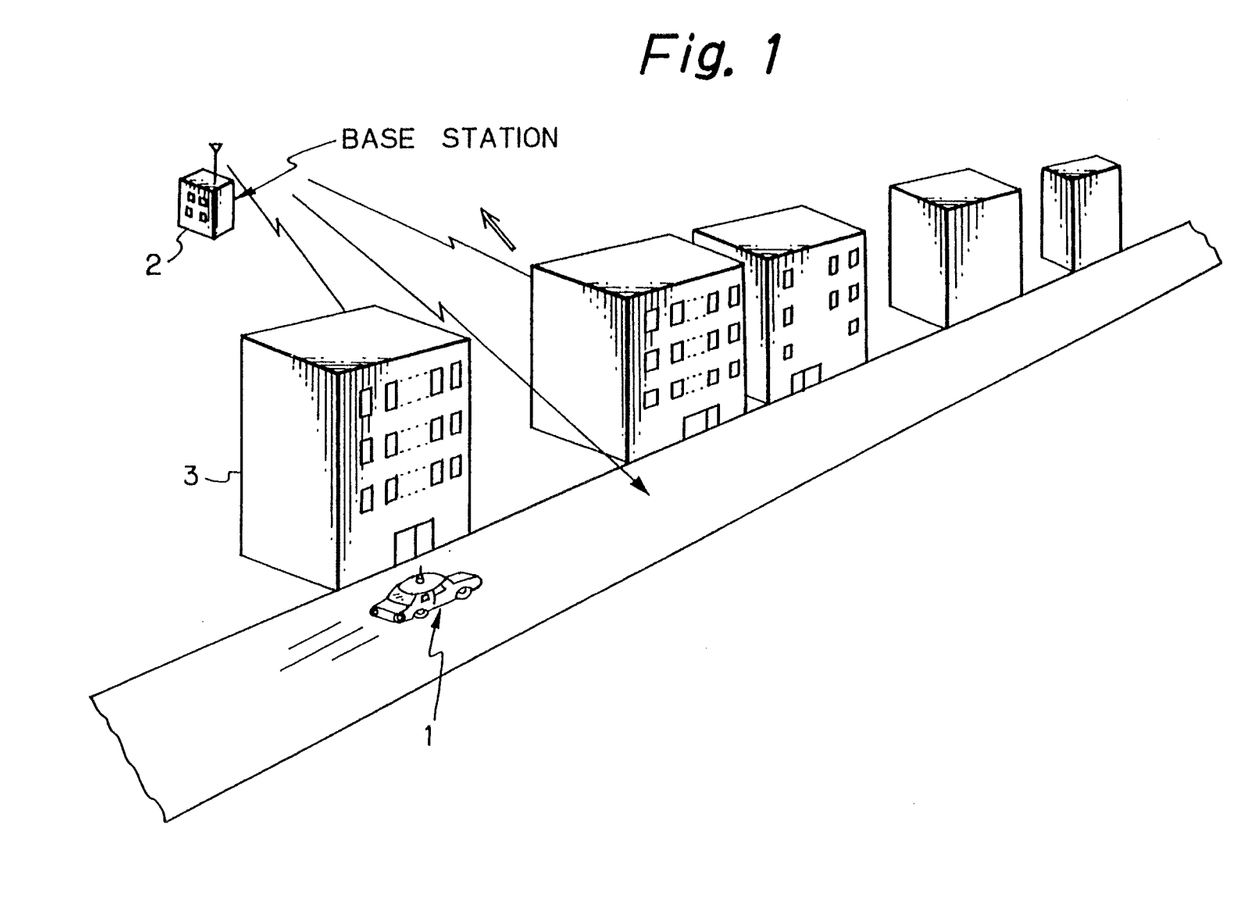
FIG. 1 illustrates a typical situation of mobile radio communication, where the mobile radio communication is carried out between the mobile radio communication apparatus in a car 1 and a base station 2, and the obstacles are buildings 3.

For example, the mobile radio communication apparatus is often carried or mounted on a moving vehicle such as a car, and the communication is carried out between the mobile radio communication apparatus in the moving vehicle and one of multiple immobile base stations provided at a predetermined plurality of places for mobile radio communication. When transmitting or receiving radio signals in a mobile radio communication apparatus, a first intensity of radio waves transmitted from the mobile radio communication apparatus toward the base station, and a second intensity of radio waves transmitted from the base station to the mobile radio communication apparatus vary depending upon the relative positions of the mobile radio communication apparatus, the base station, and obstacles temporarily located between the mobile radio communication apparatus and the base station. FIG. 1 illustrates a typical situation in mobile radio communication, where the mobile radio communication is carried out between the mobile radio communication apparatus in a car 1 and a base station 2, and the obstacles are buildings 3.

Figure 2:
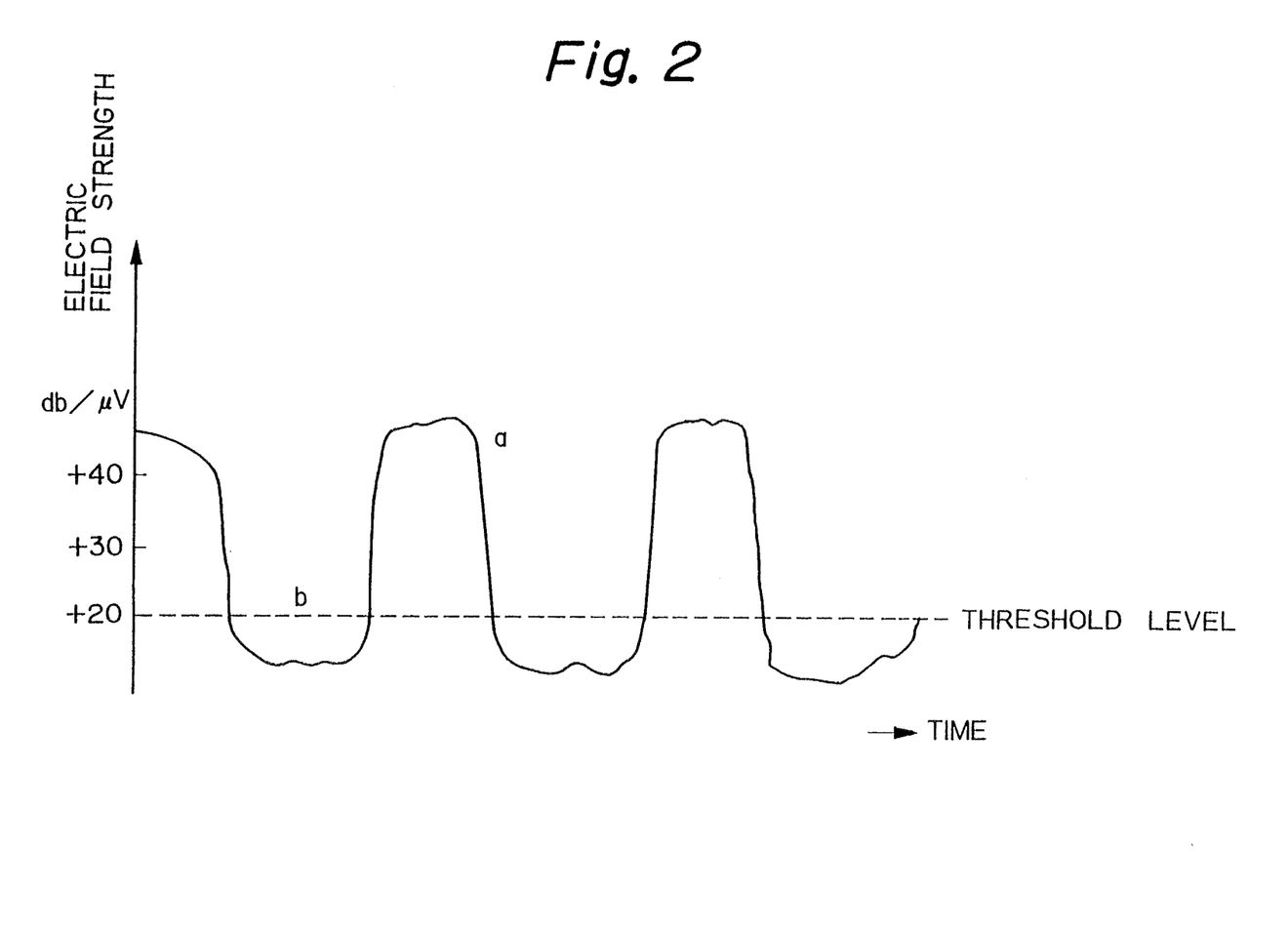
FIG. 2 indicates an example variation of a strength of an electric field detected by the mobile radio communication apparatus in the moving car 1.

FIG. 2 indicates an example variation of a strength of an electric field detected by the mobile radio communication apparatus in the moving car 1. When the strength of an electric field detected by the mobile radio communication apparatus varies as indicated in FIG. 2, the data transmitted with the electric field is lost while the strength is below a predetermined level (for example, 20 dB) as indicated with "b" in FIG. 2, and the data transmitted with the electric field may be changed while the strength rapidly falls as indicated by "a" in FIG. 2. When the intensity of radio waves transmitted from the base station to the mobile radio communication apparatus varies, the intensity of radio waves transmitted from the mobile radio communication apparatus toward the base station is considered to similarly vary. Therefore, it is advantageous to stop the transmission of data from the mobile radio communication apparatus to the base station when the intensity of radio waves transmitted from the base station to the mobile radio communication apparatus is below a predetermined level, or when the intensity rapidly falls, to prevent a serious error in data transmitted with the radio waves transmitted from the base station to the mobile radio communication apparatus.

SUMMARY OF THE INVENTION

An object of the present invention is to provide a transmission control circuit in a mobile radio communication apparatus whereby transmission of data from the mobile radio communication apparatus to a base station is stopped, to prevent a serious error in the data, when an intensity of radio waves transmitted from the base station to the mobile radio communication apparatus rapidly falls.

Another object of the present invention is to provide a transmission control circuit in a mobile radio communication apparatus whereby transmission of data from the mobile radio communication apparatus to a base station is stopped, to prevent a serious error in the data, when an intensity of radio waves transmitted from the base station to the mobile radio communication apparatus falls below a predetermined level.

According to the first aspect of the present invention, there is provided a mobile radio communication apparatus containing: an antenna for receiving and transmitting a first radio frequency signal; a transmitting signal generating unit for generating a second radio frequency signal to be transmitted through the antenna; a transmission stopping unit for stopping the operation of transmitting the second radio frequency signal when receiving a stop control signal; a strength indicating signal generating unit for receiving the radio frequency signal received by the antenna, and generating a strength indicating signal having an amplitude corresponding to a strength of an electric field received by the antenna, based on the received radio frequency signal; a first comparator unit for receiving a strength indicating signal, and comparing the amplitude of the strength indicating signal with a reference voltage to detect a first condition in which the amplitude of the strength indicating signal is below the reference voltage, to output a result of the detecting of the first condition; a rapid fall detecting unit for receiving the strength indicating signal, and detecting a second condition in which the amplitude of the strength indicating signal decreases at a rate exceeding a predetermined decreasing rate; and a stop control signal generating unit for generating the stop control signal to be supplied to the transmission stopping unit, when both the first and second conditions are detected.

According to the second aspect of the present invention, there is provided a mobile radio communication apparatus comprising: an antenna for receiving and transmitting a first radio frequency signal; a transmitting signal generating unit for generating a second radio frequency signal to be transmitted through the antenna; a transmission stopping unit for stopping the operation of transmitting the second radio frequency signal when receiving a stop control signal; a strength indicating signal generating unit for receiving the radio frequency signal received by the antenna, and generating a strength indicating signal having an amplitude corresponding to a strength of an electric field received by the antenna, based on the received radio frequency signal; a first comparator unit for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected; a first duration obtaining unit for receiving the state indicating signal, and obtaining and outputting a first duration in which the first condition continues; a rapid fall detecting unit for receiving the strength indicating signal, and detecting a second condition in which the amplitude of the strength indicating signal decreases at a rate exceeding a predetermined decreasing rate; a second duration determining unit for determining a second duration in which the operation of transmitting the second radio frequency signal is to be stopped, based on the first duration; and a stop control signal generating unit for generating the stop control signal to be supplied to the transmission stopping unit to stop the operation of transmitting the second radio frequency signal for the second duration, when the second condition is detected.

According to the third aspect of the present invention, there is provided a mobile radio communication apparatus comprising: an antenna for receiving and transmitting a first radio frequency signal; a transmitting signal generating unit for generating a second radio frequency signal to be transmitted through the antenna; a transmission stopping unit for stopping the operation of transmitting the second radio frequency signal when receiving a stop control signal; a strength indicating signal generating unit for receiving the radio frequency signal received by the antenna, and generating a strength indicating signal having an amplitude corresponding to a strength of an electric field received by the antenna, based on the received radio frequency signal; a first comparator unit for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected; a first duration obtaining unit for receiving the state indicating signal, and obtaining and outputting a first duration in which the first condition continues; a rapid fall detecting unit for receiving the strength indicating signal, and detecting a second condition in which the amplitude of the strength indicating signal decreases at a rate exceeding a predetermined decreasing rate; a first duration storing unit for storing the first duration obtained by the first duration obtaining unit when the second condition is detected; a second duration determining unit for determining a second duration in which the operation of transmitting the second radio frequency signal is to be stopped, based on a plurality of values of the first duration, where the plurality of values are successively obtained by the first duration obtaining unit within a predetermined duration; and a stop control signal generating unit for generating the stop control signal to be supplied to the transmission stopping unit to stop the operation of transmitting the second radio frequency signal for the second duration, when the second condition is detected.

According to the fourth aspect of the present invention, there is provided a mobile radio communication apparatus comprising: an antenna for receiving and transmitting a first radio frequency signal; a transmitting signal generating unit for generating a second radio frequency signal to be transmitted through the antenna; a transmission stopping unit for stopping the operation of transmitting the second radio frequency signal when receiving a stop control signal; a strength indicating signal generating unit for receiving the radio frequency signal received by the antenna, and generating a strength indicating signal having an amplitude corresponding to a strength of an electric field received by the antenna, based on the received radio frequency signal; a first comparator unit for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected; a first duration obtaining unit for receiving the state indicating signal, and obtaining and outputting a first duration in which the first condition continues; a first duration storing unit for storing the first duration obtained by the first duration obtaining unit; a second duration determining unit for determining a second duration in which the operation of transmitting the second radio frequency signal is to be stopped, based on a plurality of values of the first duration, where the plurality of values are successively obtained by the first duration obtaining unit within a predetermined duration; and a stop control signal generating unit for generating the stop control signal to be supplied to the transmission stopping unit to stop the operation of transmitting the second radio frequency signal for the second duration, when the first condition is detected.

DESCRIPTION OF THE PREFERRED EMBODIMENTS

Figure 3:
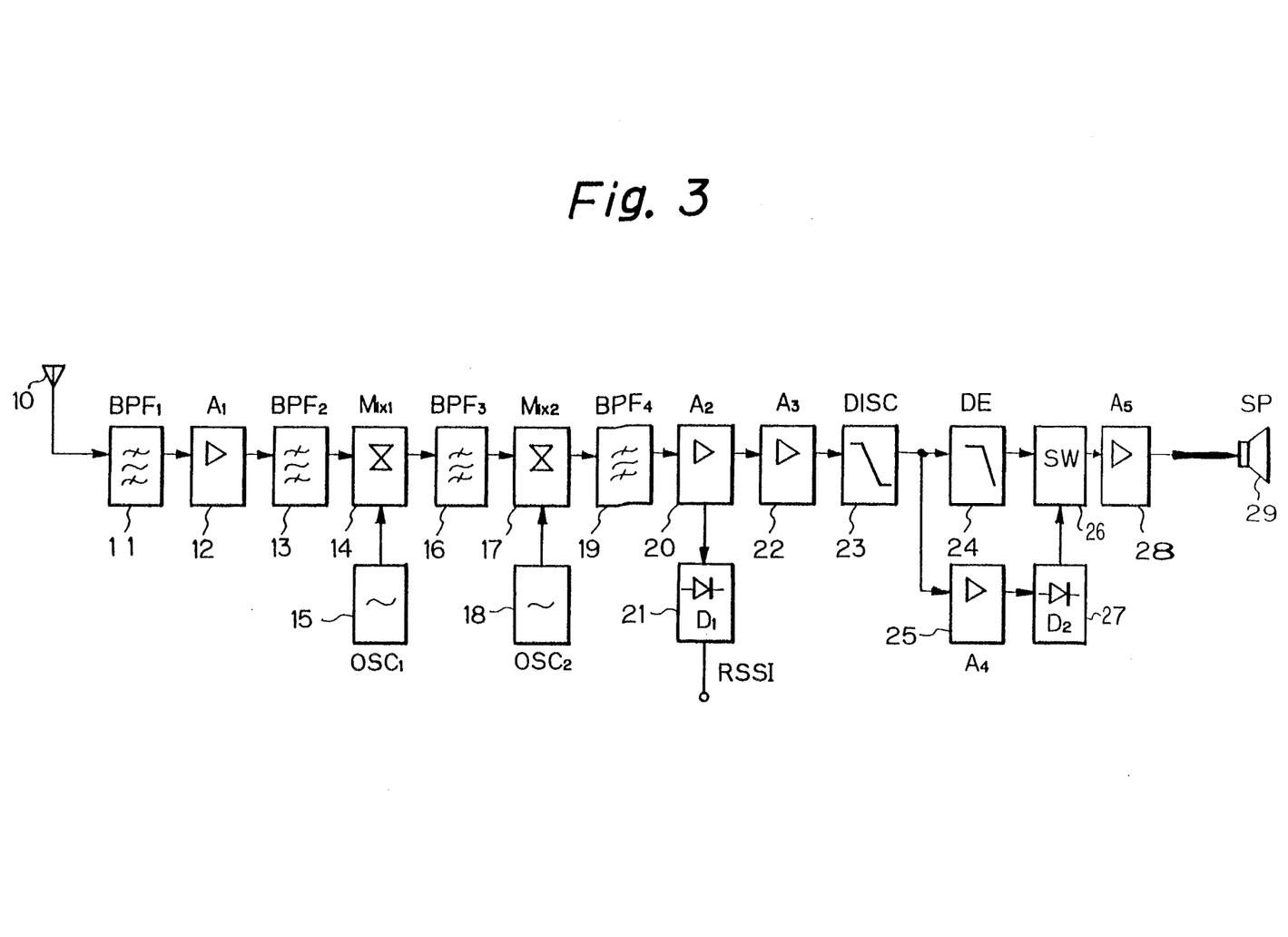
FIG. 3 is a block diagram of a conventional radio receiver.

FIG. 3 is a block diagram of a conventional construction of a radio receiver which is used for carrying out single-channel narrow-band radio communication. In FIG. 3, reference numeral 10 denotes an antenna, 11, 13, 16, and 19 each denote a band pass filter, 12 denotes a high frequency amplifier, 14 denotes a first mixer, 17 denotes a second mixer, 15 denotes a first oscillator, 18 denotes a second oscillator, 20, 22, 25, and 28 each denote an amplifier, 21 and 27 each denote a detector, 23 denotes a frequency discriminator, 24 denotes a de-emphasis circuit, 26 denotes a switch, and 29 denotes a speaker.

In the construction of FIG. 3, a radio frequency (for example, 800 MHz) signal is received through the antenna 10 and the band pass filter 11 to be applied to the high frequency amplifier 12. The radio frequency signal is amplified by the high frequency amplifier 12, and is then filtered by the band pass filter 13 to be applied to the first mixer 14. In the first mixer 14, the frequency of the above high frequency signal is converted into a first intermediate frequency band which is a predetermined within a frequency range of, for example, 70 to 90 MHz, by mixing the radio frequency signal with a first mixing signal generated by the first oscillator 15. The first intermediate frequency signal (the above frequency-converted signal in the first intermediate frequency band) is applied to the second mixer 17 after unnecessary frequency components thereof are eliminated through the band pass filter 16. In the second mixer 17, the frequency of the above signal in the first intermediate frequency band is converted into a second intermediate frequency band of a frequency for example, 455 kHz, by mixing the second intermediate frequency signal with a second mixing signal generated by the second oscillator 18. Then, unnecessary frequency components of the second intermediate frequency signal (the above frequency-converted signal in the second intermediate frequency band) are eliminated through the band pass filter 19, and then the second intermediate frequency signal is amplified through the amplifiers 20 and 22 to be applied to the frequency discriminator 23. By the frequency discriminator 23, a base band signal is extracted from the second intermediate frequency signal, and then the base band signal is applied to the deemphasis circuit 24. It is assumed that the radio frequency signal received as above has an emphasis characteristic of, for example, 6 dB/octave. The emphasis characteristic of the above base band signal output from the frequency discriminator 23 is compensated by the de-emphasis circuit 24 to obtain a base band signal having a predetermined frequency characteristic. The base band signal is then applied to the amplifier 28 through the switch 26, to be amplified by the amplifier 28 to drive the speaker 29.

A predetermined noise component which is also output from the above frequency discriminator 23 is amplified by the amplifier 25, and is then applied to the detector 27 to obtain a direct current voltage. The obtained direct current voltage is applied to the switch 26 as a control voltage. When an intensity of the above received radio frequency signal falls, the direct current voltage becomes above a predetermined level, and the switch 26 is made OFF so that the speaker 29 is not driven by the noise component.

The intensity of the above received radio frequency signal is reflected in the intensity of the above second intermediate frequency signal. Therefore, the output of the amplifier 20 is also applied to the detector 21 to obtain a direct current level in which the intensity of the received radio frequency signal is reflected. The direct current level obtained by the detector 21 is denoted by a receiving signal strength indicator (RSSI).

Figure 4:
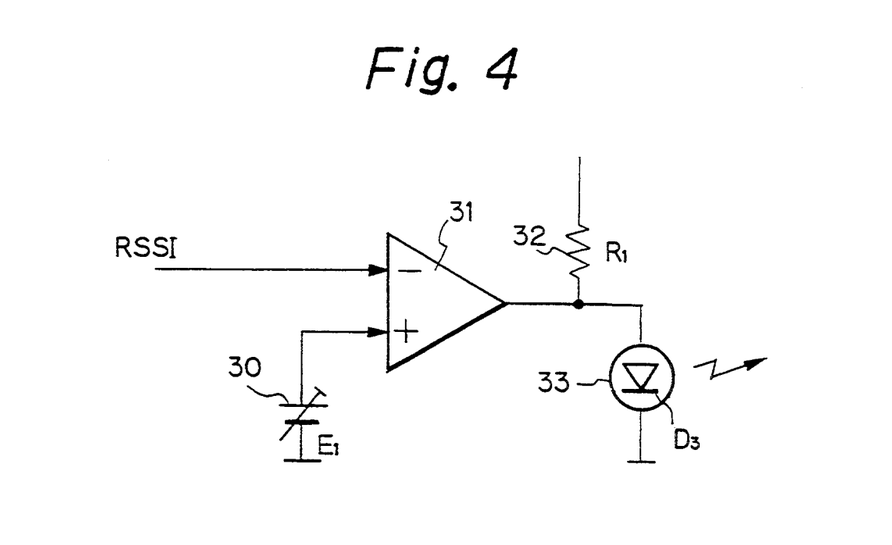
FIG. 4 illustrates a construction for generating an alarm indication when the intensity of the received radio frequency signal falls.
Figure 5:
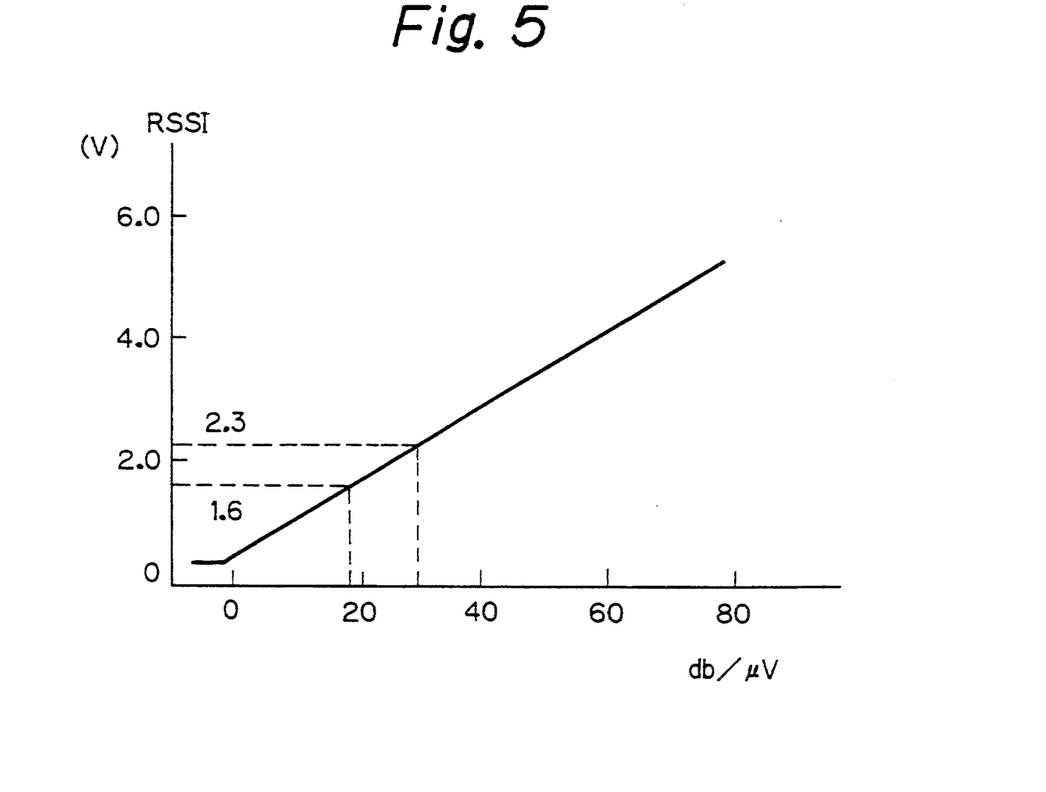
FIG. 5 indicates a relationship between an electric field strength of the radio frequency signal received by the antenna 10 and the receiving signal strength indicator (RSSI)

FIG. 4 illustrates a construction for generating an alarm indication when the intensity of the received radio frequency signal falls. In FIG. 4, reference numeral 30 denotes a variable voltage source, 31 denotes a comparator, 32 denotes a resistor, and 33 denotes a photodiode. The variable voltage source 30 is preset to output a threshold voltage to be applied to one input terminal of the comparator 31. The above receiving signal strength indicator (RSSI) is applied to the other input terminal of the comparator 31 to compare the receiving signal strength indicator (RSSI) with the threshold level. When the voltage level of the receiving signal strength indicator (RSSI) is below the threshold level, the output level of the comparator becomes high, and the photodiode 33 emits a light to indicate that the intensity of the received radio frequency signal has fallen. The above threshold level is preset so that the above photodiode 33 emits a light when the electric field received radio frequency signal falls below +20 to 30 dB/mV. When a relationship between an electric field strength of the radio frequency signal received by the antenna 10 and the receiving signal strength indicator (RSSI) is as indicated in FIG. 5, the threshold voltage is preset to be 1.6 to 2.3 V.

Figure 6:
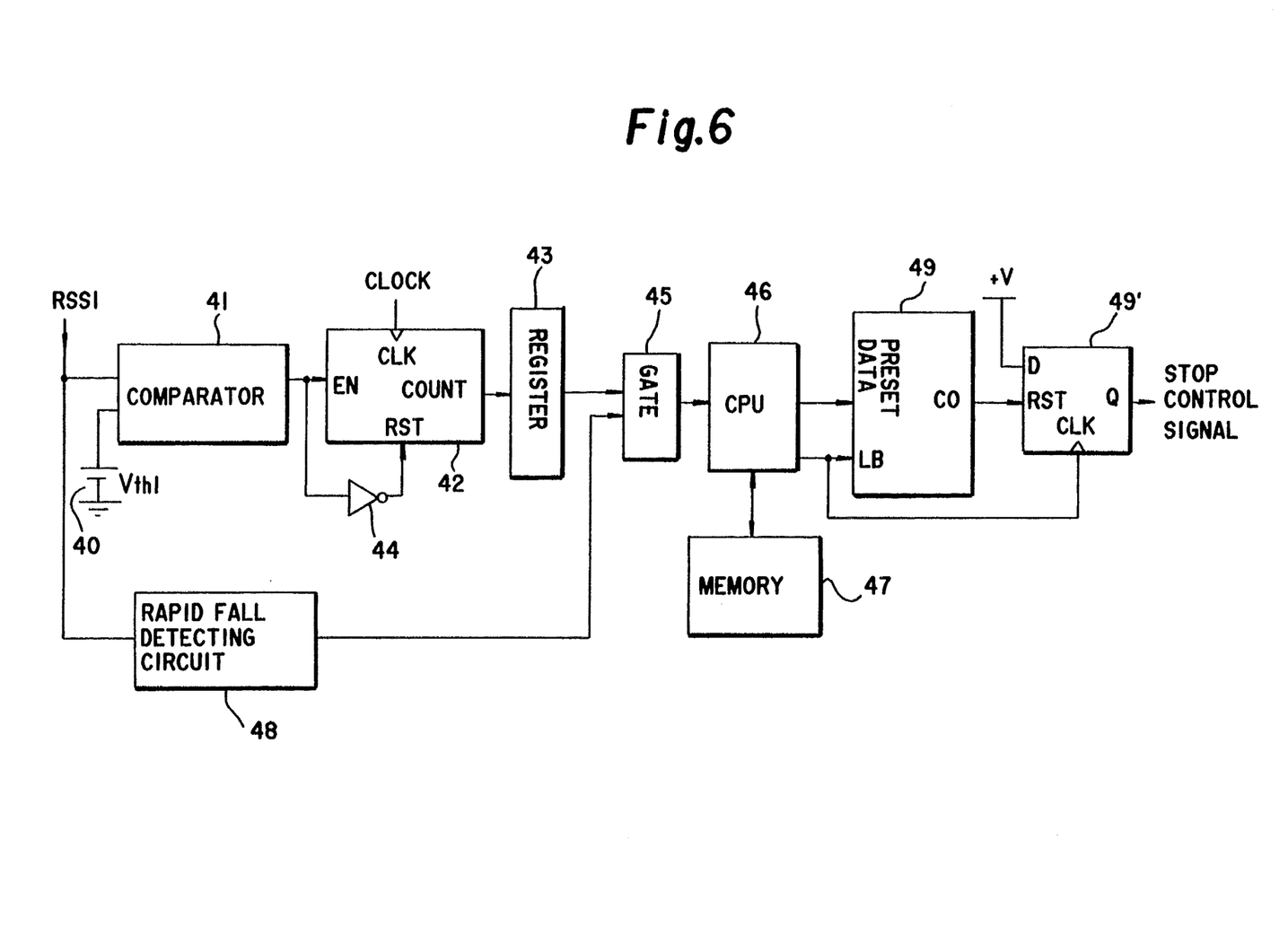
FIG. 6 is a diagram of a transmission control circuit as an embodiment of the present invention.

FIG. 6 is a diagram illustrating the construction of a transmission control circuit as an embodiment of the present invention. In FIG. 6, reference numeral 40 denotes a voltage source, 41 denotes a comparator, 42 denotes a counter, 43 denotes a register, 44 denotes an inverter, 45 denotes a gate circuit, 46 denotes a central processing unit, 47 denotes a memory, 48 denotes a rapid fall detection circuit, 49 denotes a counter, and 49' denotes a D-type flip flop circuit.

The voltage source 40 supplies a threshold voltage Vth1 to the comparator as a reference voltage. The above receiving signal strength indicator (RSSI) is applied to the comparator 41 to be compared with the threshold voltage Vth1. When the voltage level of the receiving signal strength indicator (RSSI) is lower than the threshold voltage Vth1, the output of the comparator 41 is active. The output of the comparator 41 is applied to an enable input terminal EN of the counter 42, and is also applied to a reset input terminal RST of the counter 42 through the inverter 44, and a latch control terminal of the register 43. The counter 42 receives a clock signal at its edge-triggered input terminal CLK, and increments its count at every clock cycle when an active signal is applied to the enable input terminal EN. Thus, the count of the counter 42 indicates a duration in which the voltage level of the receiving signal strength indicator (RSSI) is continuously lower than the threshold voltage Vth1. The count of the counter 42 is applied to the register 43. When the output of the comparator 41 transits from an active state to an inactive state, the output of the counter 42 is latched in the register 43, and the comparator 41 is reset to an initial state in which the count of the counter 42 is zero. The output of the register 43 is applied to the gate circuit 45.

Figure 7:
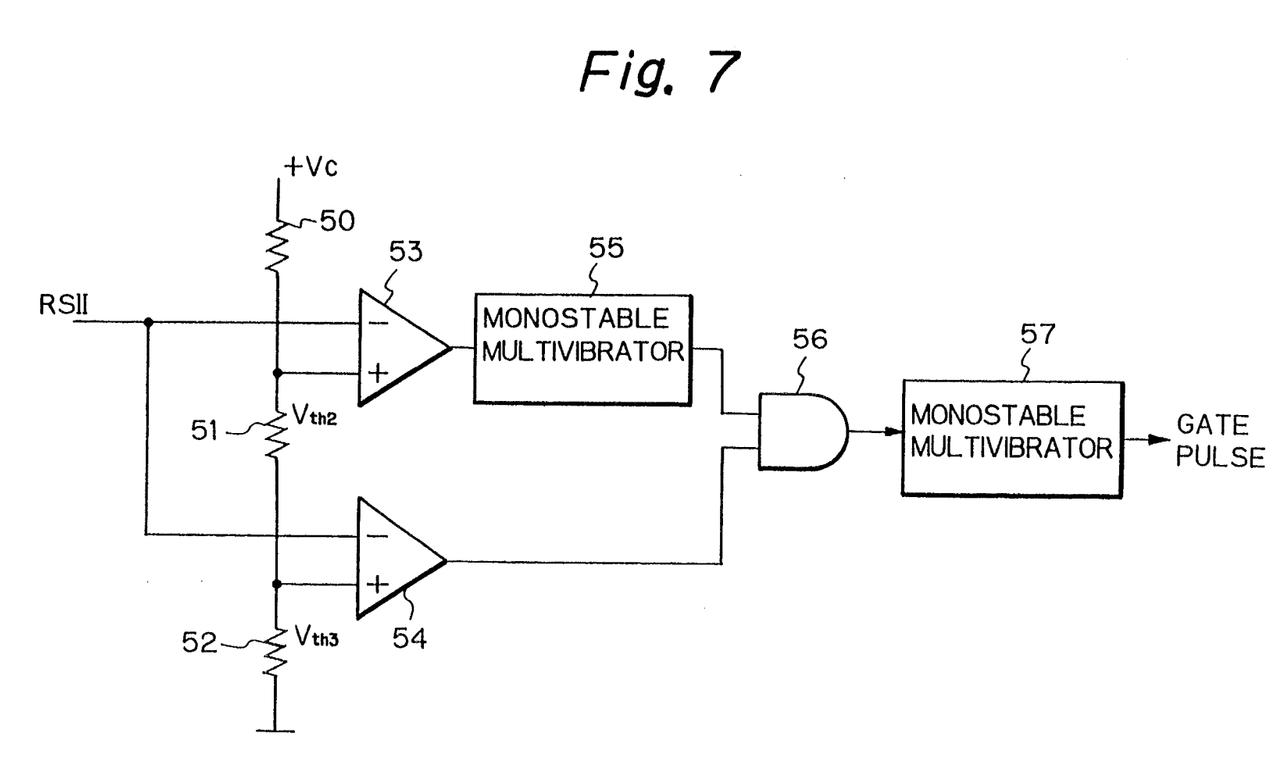
FIG. 7 is a diagram illustrating the construction of the rapid fall detection circuit 48 in FIG. 6.
Figure 8A:
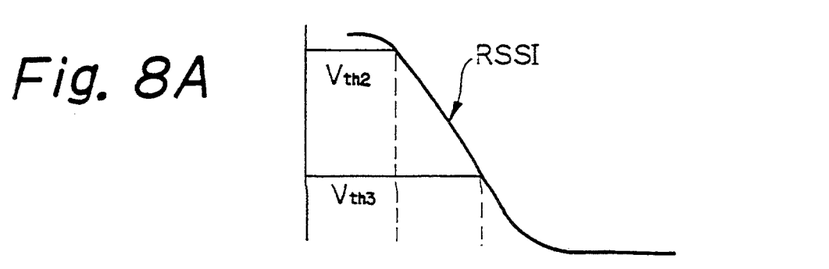
FIGS. 8A to 8F are time charts indicating an operation of the rapid fall detecting circuit of FIG. 7 when the voltage level of the receiving signal strength indicator (RSSI) falls rapidly.
Figure 8B:
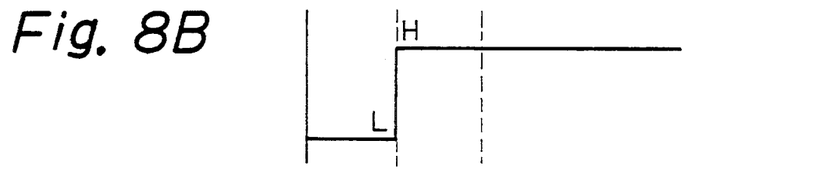
Figure 8C:
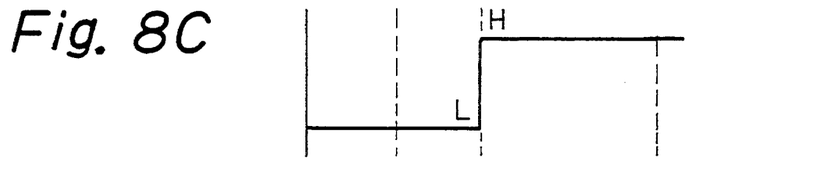
Figure 8D:
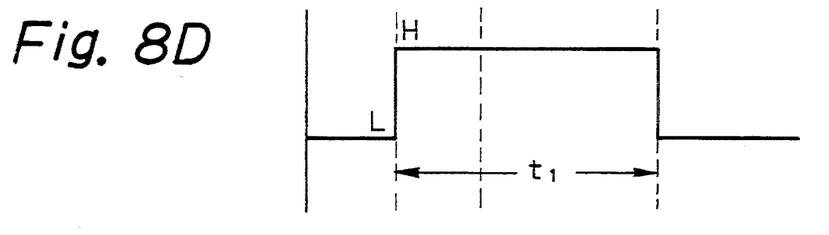
Figure 8E:
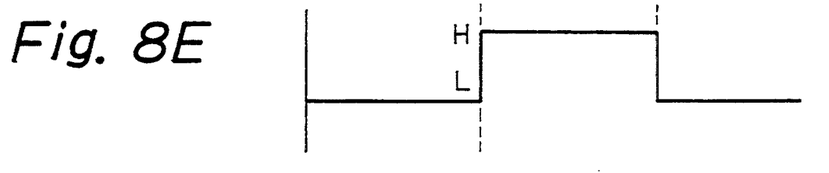
Figure 9A:
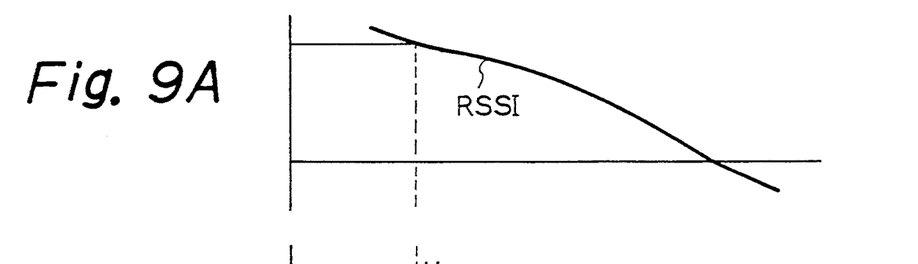
FIGS. 9A to 9F are time charts indicating an operation of the rapid fall detecting circuit of FIG. 7 when the voltage level of the receiving signal strength indicator (RSSI) falls slowly.
Figures 9B, 9C, 9D:
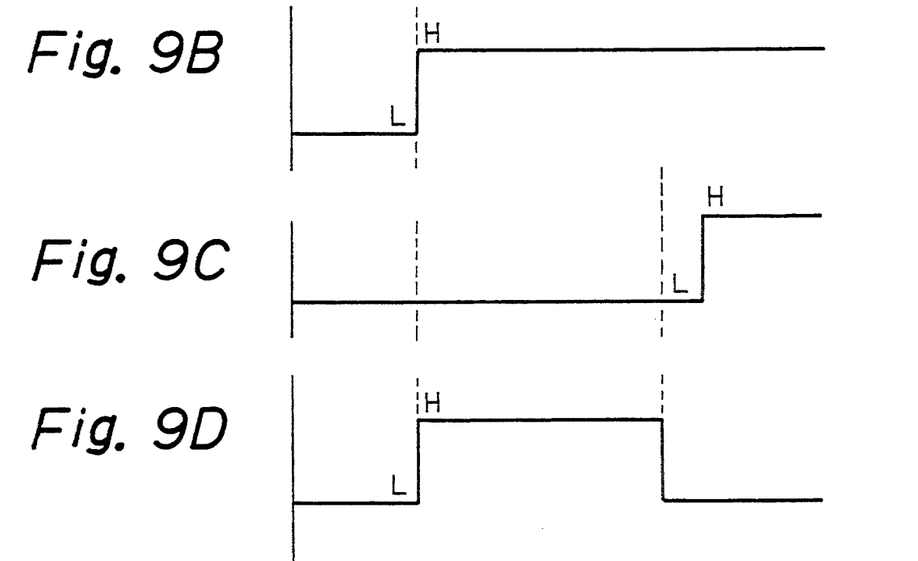

FIG. 7 illustrates the construction of the rapid fall detecting circuit 48 in FIG. 6. In FIG. 7, reference numeral 50, 51, and 52 each denote a resistor, 53 and 54 each denote a comparator, 55 and 57 each denote a monostable multivibrator, and 56 denotes an AND gate. The resistors 50, 51, and 52 are connected in series between a high voltage source +Vc and earth level so that a first threshold voltage Vth2 is obtained from a point at which the resistors 50 and 51 are connected, and a second threshold voltage Vth3 is obtained from a point at which the resistors 51 and 52 are connected. The first threshold voltage Vth2 is supplied to an input terminal of the comparator 53 as a reference voltage, and the second threshold voltage Vth3 is supplied to an input terminal of the comparator 54 as a reference voltage. The receiving signal strength indicator (RSSI) is applied to the other input terminals of the comparators 53 and 54 to be compared with the first and second threshold voltages Vth2 and Vth3, respectively. The output of the comparator 53 is active when the voltage level of the receiving signal strength indicator (RSSI) is lower than the first threshold voltage Vth2, and the output of the comparator 54 is active when the voltage level of the receiving signal strength indicator (RSSI) is lower than the second threshold voltage Vth3. The output of the comparator 53 is applied to the monostable multivibrator 55. The monostable multivibrator 55 generates an active signal having a predetermined duration t1 (as indicated in FIG. 8C and 9C) starting when the input thereof rises (becomes active). The outputs of the monostable multivibrator 55 and the comparator 54 are applied to the two input terminals of the AND gate 56. The output of the AND gate 56 is applied to the monostable multivibrator 57. The monostable multivibrator 57 generates a gate pulse to be applied to the gate circuit 45 in FIG. 6.

Figure 8F:
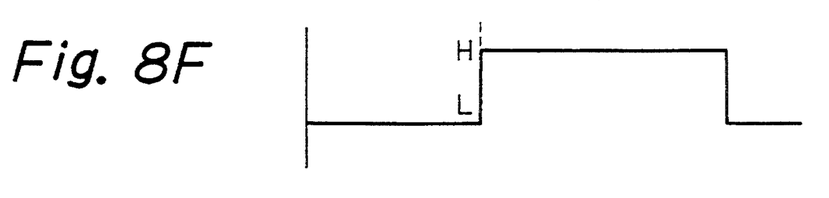
Figure 9E:
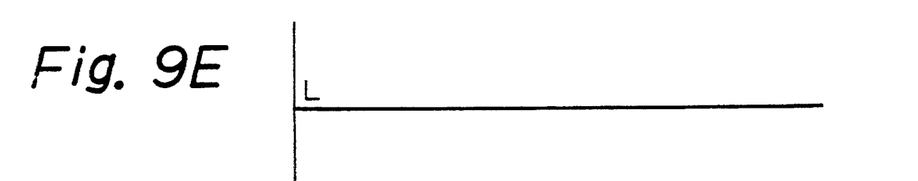
Figure 9F:
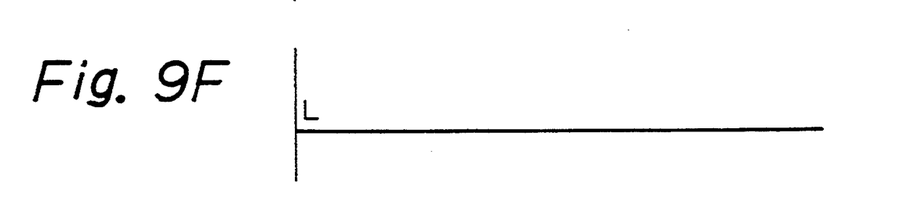

FIGS. 8A to 8F are time charts indicating an operation of the rapid fall detecting circuit of FIG. 7 when the voltage level of the receiving signal strength indicator (RSSI) falls rapidly. Since the output of the comparator 54 rises (FIG. 8C) when the output of the monostable multivibrator 55 is active (FIG. 8D), the output of the AND gate 56 becomes active (FIG. 8E) to trigger the monostable multivibrator 57 to output an active gate pulse (FIG. 8F). FIGS. 9A to 9F are time charts indicating an operation of the rapid fall detecting circuit of FIG. 7 when the voltage level of the receiving signal strength indicator (RSSI) falls slowly. Since the output of the comparator 54 rises (FIG. 9C) after the output of the monostable multivibrator 55 becomes inactive (FIG. 9D), the output of the AND gate 56 does not become active (FIG. 9E). Therefore, the monostable multivibrator 57 is not triggered, and no active gate pulse is output from the rapid fall detecting circuit of FIG. 7 (FIG. 9F).

The output of the register 43 passes through the gate circuit 45 to be applied to the CPU 46 when the output of the rapid fall detecting circuit 48 is active. Thus, the value of the duration in which the voltage level of the receiving signal strength indicator (RSSI) is continuously lower than the threshold voltage Vth1, is supplied to the CPU 46.

When only a predetermined number of higher order bits of the count output of the counter 42 are applied to the register 43, the value of the duration in which the voltage level of the receiving signal strength indicator (RSSI) is continuously lower than the threshold voltage Vth1, is latched in the register 43 only when the duration is longer than a predetermined time. Alternatively, although not shown, a digital comparator may be provided in the construction of FIG. 6 to compare the count of the counter 42 with a predetermined value to generate a second gate pulse which is active only when the count of the counter 42 is greater than a predetermined number, and the second gate pulse is supplied to the gate circuit 45. In this case, the gate circuit 45 may comprise an AND gate (not shown) receiving both the gate pulses supplied from the above digital comparator and from the rapid fall detecting circuit of FIG. 7, and the gate circuit 45 makes the output of the register 43 pass through the gate circuit 45 to be applied to the CPU 46 only when the output of the AND gate is active.

Figure 10:
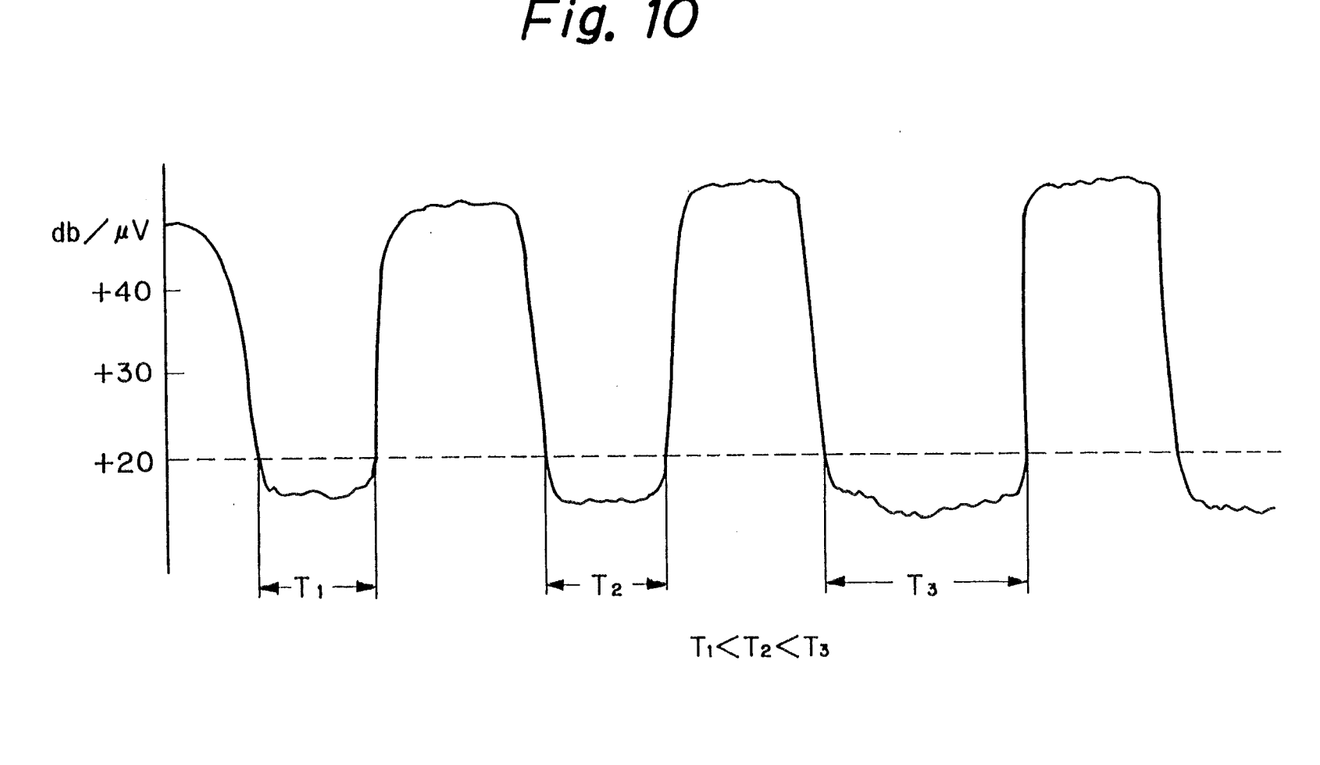
FIG. 10 is a timing diagram indicating a variation of a electric field strength at the antenna 10, and the durations in which the voltage level of the receiving signal strength indicator (RSSI) is continuously lower than the threshold voltage Vth1, respectively.

The CPU 46 reads the output (the count value indicating the duration in which the voltage level of the receiving signal strength indicator (RSSI) is continuously lower than the threshold voltage Vth1) of the gate circuit 45, and stores the output in the memory 47 as an interrupt process when the gate pulse from the rapid fall detecting circuit of FIG. 7 becomes active. In the above alternative case, the CPU 46 reads the output of the gate circuit 45, and stores the output in the memory 47 as an interrupt process when the output of the above AND gate receiving both the gate pulses supplied from the above digital comparator and from the rapid fall detecting circuit of FIG. 7, becomes active. When a predetermined number (one or more, for example, three) of the count values are read and stored in the memory 47 in a predetermined time (for example, 30 seconds), the CPU 46 obtains the largest value of the predetermined number of count values, and then multiplies the largest value by a predetermined factor (for example, a value from 3 to 5) to obtain a transmission stop time. Then, the CPU 46 sets the D-type flip flop circuit 49', and supplies the transmission stop time to the counter 49 to preset the transmission stop time in the counter 49. The counter 49 decrements its count when receiving a clock signal. When the count of the counter 49 reaches zero, an active carry output of the counter 49 is applied to a reset input terminal RST of the D-type flip flop circuit 49' to reset the D-type flip flop circuit 49'. Thus, the Q output of the D-type flip flop circuit 49' is active for a duration equal to the transmission stop time. The Q output of the D-type flip flop circuit 49' is supplied as a stop control signal to a data mute circuit in a radio receiver provided in the mobile radio communication apparatus. FIG. 10 is a timing diagram indicating a variation of an electric field strength at the antenna 10, and the durations in which the voltage level of the receiving signal strength indicator (RSSI) is continuously lower than the threshold voltage Vth1, respectively. In FIG. 10, the lengths of the durations are denoted by T1, T2, and T3, where TI<T2<T3. The longest duration T3 is used as a basis for obtaining the transmission stop time.

Figure 11:
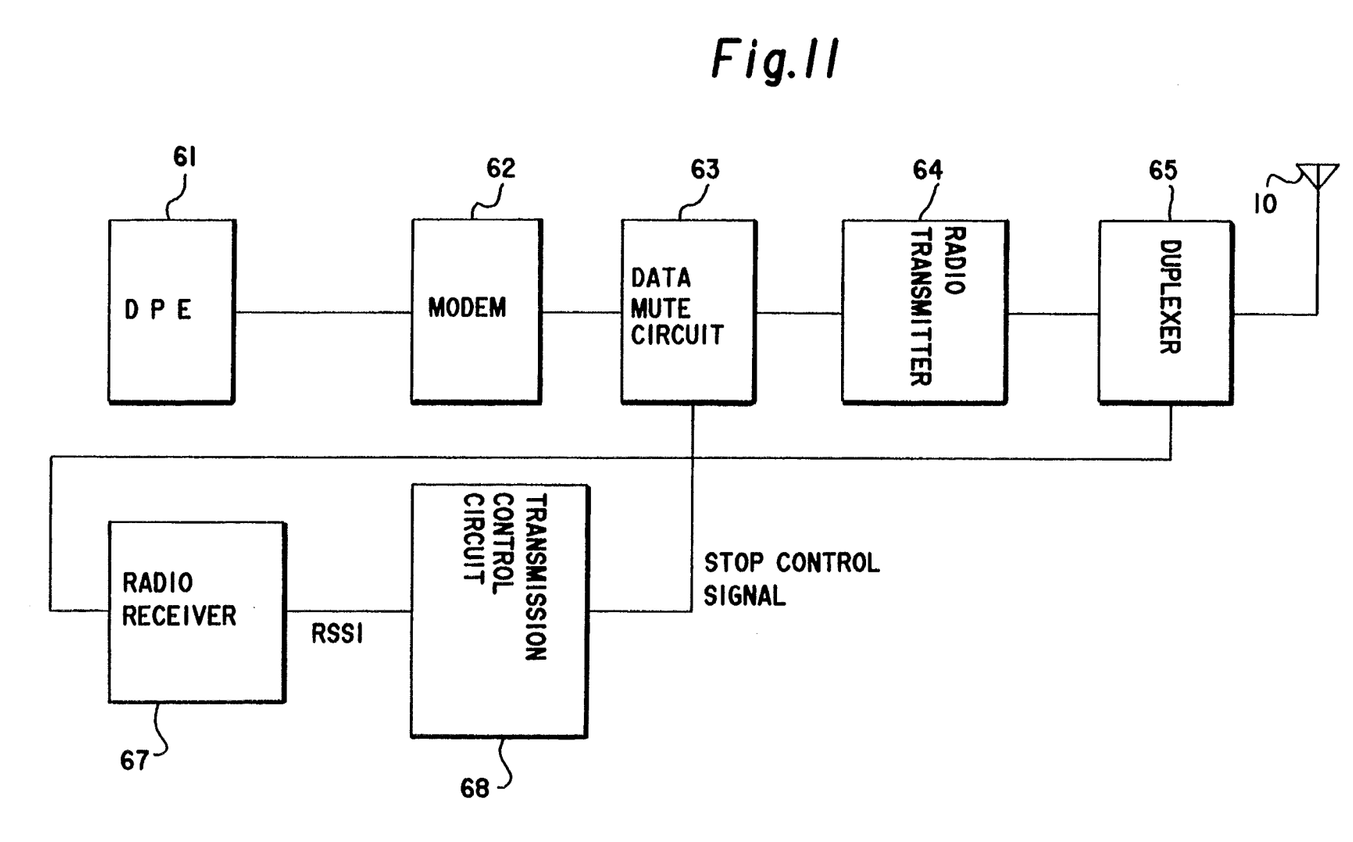
FIG. 11 is a block diagram of the mobile radio communication apparatus containing the above transmission control circuit, the radio receiver of FIG. 3, and a radio transmitter.

FIG. 11 is a block diagram of the mobile radio communication apparatus containing the above transmission control circuit, the radio receiver of FIG. 3, and a radio transmitter. In FIG. 11, reference numeral 61 denotes data terminal equipment, 62 denotes a MODEM (modulator/demodulator), 63 denotes the data mute circuit, 64 denotes a transmitting portion, 65 denotes a duplexer, 66 denotes an antenna, 67 denotes the radio receiver of FIG. 3, and 68 denotes the transmission control circuit of FIGS. 6 and 7.

In the construction of FIG. 11, the data terminal equipment 61 generates digital data to be transmitted, and the MODEM 62 converts the digital data into an analog signal. The analog signal is supplied through the data mute circuit 63 to the transmitter portion 64 to generate a radio frequency signal by modulating a high frequency carrier with the output of the MODEM 62. The radio frequency signal is supplied to the antenna 10 through the duplexer to transmit the radio frequency signal from the antenna 10. The stop control signal output from the transmission control circuit 68 as explained with reference to FIGS. 6 and 7 is supplied to the data mute circuit 63. The data mute circuit 63 stops the output of the MODEM 62 so that the output of the MODEM 62 is not supplied to the transmitter portion 64. Thus, according to the present invention, in response to a predetermined number of successive rapid falls of the intensity of the received radio frequency signal, the transmission of data from the mobile radio communication apparatus is stopped for a duration determined based on the maximum duration in which the voltage level of the receiving signal strength indicator (RSSI) is continuously lower than the threshold voltage Vth1, and therefore, transmission of data containing an error is prevented.

In addition to the above embodiment, some variations can be obtained within the scope of the present invention. First, in the construction of FIG. 6, the transmission stop time need not be determined based on the longest duration in which the voltage level of the receiving signal strength indicator (RSSI) is continuously lower than the threshold voltage Vth1. Instead of the longest duration, a sum or an average of the predetermined number of durations may be used as the basis for obtaining the transmission stop time. Further, the transmission stop time may be a constant time regardless of the duration in which the voltage level of the receiving signal strength indicator (RSSI) is continuously lower than the threshold voltage Vth1. In the latter case, the counter 42 and the inverter 44 may be eliminated in the construction of FIG. 6.

Otherwise, a construction without the rapid fall detecting circuit 48 can be used for stopping the transmission. In this case, the gate circuit 45 is also eliminated in the construction of FIG. 6.

I claim:

1. A mobile radio communication apparatus, comprising:
    signal reception means for receiving a first radio frequency signal, and a signal transmission means for transmitting a second radio frequency signal;
    a transmitting signal generating means for generating the second radio frequency signal to be transmitted through the antenna;
    a transmission stopping means for immediately stopping the operation of transmitting the second radio frequency signal when receiving a stop control signal;
    a strength indicating signal generating means for receiving the radio frequency signal received by the antenna, and generating a strength indicating signal having an amplitude corresponding to a strength of an electric field received by the antenna, based on the received radio frequency signal;
    a first comparator means for receiving said strength indicating signal, and comparing the amplitude of the strength indicating signal with a reference voltage to detect a first condition in which the amplitude of the strength indicating signal is below the reference voltage, to output a result of the detecting of the first condition;
    a rapid fall detecting means for receiving the strength indicating signal, and detecting a second condition in which the amplitude of the strength indicating signal decreases at a rate exceeding a predetermined decreasing rate; and
    a stop control signal generating means for generating the stop control signal to be supplied to the transmission stopping means, when both the first and second conditions are satisfied.

2. A mobile radio communication apparatus comprising:
    signal reception means for receiving a first radio frequency signal, and a signal transmission means for transmitting a second radio frequency signal;
    a transmitting signal generating means for generating the second radio frequency signal to be transmitted through the antenna;
    a transmission stopping means for stopping the operation of transmitting the second radio frequency signal when receiving a stop control signal;
    a strength indicating signal generating means for receiving the radio frequency signal received by the antenna, and generating a strength indicating signal having an amplitude corresponding to a strength of an electric field received by the antenna, based on the received radio frequency signal;
    a first comparator means for receiving said strength indicating signal, and comparing the amplitude of the strength indicating signal with a reference voltage to detect a first condition in which the amplitude of the strength indicating signal is below the reference voltage, to output a result of the detecting of the first condition; and
    a rapid fall detecting means for receiving the strength indicating signal, and detecting a second condition in which the amplitude of the strength indicating signal decreases at a rate exceeding a predetermined decreasing rate and a stop control signal generating means for generating the stop control signal to be supplied to the transmission stopping means, when both the first and second conditions are satisfied,
    wherein the rapid fall detecting means comprises:
        a second comparator means for receiving a strength indicating signal, and comparing the amplitude of the strength indicating signal with a second reference voltage to detect a first time at which the amplitude of the strength indicating signal becomes below the second reference voltage;
        a third comparator means for receiving a strength indicating signal, and comparing the amplitude of the strength indicating signal with a third reference voltage to detect a second time at which the amplitude of the strength indicating signal becomes below the third reference voltage; and
        means for detecting the second condition by detecting a third condition in which the time difference from the first time to the second time is less than a predetermined time.

3. A message signal transmission control circuit, comprising:
    a strength indicating signal receiving means for receiving a strength indicating signal;
    a first comparator means for receiving a strength indicating signal, and comparing the amplitude of the strength indicating signal with a reference voltage to detect a first condition in which the amplitude of the strength indicating signal is below the reference voltage to output a result of the detecting of the first condition;

a rapid fall detecting means for receiving the strength indicating signal, and detecting a second condition in which the amplitude of the strength indicating signal decreases at a rate exceeding a predetermined decreasing rate; and an immediate stop control signal generating means for immediately generating said stop control signal when both the first and second conditions are detected.

4. A message signal transmission control circuit, comprising:

a strength indicating signal receiving means for receiving a strength indicating signal;

a first comparator means for receiving a strength indicating signal, and comparing the amplitude of the strength indicating signal with a reference voltage to detect a first condition in which the amplitude of the strength indicating signal is below the reference voltage to output a result of the detecting of the first condition; and a rapid fall detecting means for receiving the strength indicating signal, and detecting a second condition in which the amplitude of the strength indicating signal decreases at a rate exceeding a predetermined decreasing rate and a stop control signal generating means for generating said stop control signal when both the first and second conditions are detected, wherein the rapid fall detecting means comprises:

a second comparator means for receiving a strength indicating signal, and comparing the amplitude of the strength indicating signal with a second reference voltage to detect a first time at which the amplitude of the strength indicating signal becomes below the second reference voltage;

a third comparator means for receiving a strength indicating signal, and comparing the amplitude of the strength indicating signal with a third reference voltage to detect a second time at which the amplitude of the strength indicating signal becomes below the third reference voltage; and means for detecting the second condition by detecting a third condition in which the time difference from the first time to the second time is less than a predetermined time.

5. A mobile radio communication apparatus, comprising:

signal reception means for receiving a first radio frequency signal, and a signal transmission means for transmitting a second radio frequency signal;

a transmitting signal generating means for generating the second radio frequency signal to be transmitted through the antenna;

a transmission stopping means for stopping the operation of transmitting the second radio frequency signal when receiving a stop control signal;

a strength indicating signal generating means for receiving the radio frequency signal received by the antenna, and generating a strength indicating signal having an amplitude corresponding to a strength of an electric field received by the antenna, based on the received radio frequency signal;

a first comparator means for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected;

a first duration obtaining means for receiving the state indicating signal, and obtaining and outputting a first duration in which the first condition continues;

a rapid fall detecting means for receiving the strength indicating signal, and detecting a second condition in which the amplitude of the strength indicating signal decreases at a rate exceeding a predetermined decreasing rate;

a second duration determining means for determining a second duration in which the operation of transmitting the second radio frequency signal is to be stopped, based on the first duration;

and a stop control signal generating means for generating the stop control signal to be supplied to the transmission stopping means to stop the operation of transmitting the second radio frequency signal for the second duration when the second condition is detected.

6. A mobile radio communication apparatus according to claim 5, wherein the rapid fall detecting means comprises:

a second comparator means for receiving a strength indicating signal, and comparing the amplitude of the strength indicating signal with a second reference voltage to detect a first time at which the amplitude of the strength indicating signal becomes below the second reference voltage;

a third comparator means for receiving a strength indicating signal, and comparing the amplitude of the strength indicating signal with a third reference voltage to detect a second time at which the amplitude of the strength indicating signal becomes below the third reference voltage; and a rapid fall condition detecting means for detecting the second condition by detecting a third condition in which the time difference from the first time to the second time is less than a predetermined time.

7. A mobile radio communication apparatus according to claim 6, further comprising a gate means for supplying the first duration obtained by the first duration obtaining means to the second duration determining means when receiving an active gate control signal; the rapid fall detecting means further comprising a gate control signal generating means for generating the gate control signal to be supplied to the gate means when the rapid fall condition detecting means detects the third condition.

8. A message signal transmission control circuit, comprising:

a strength indicating signal receiving means for receiving a strength indicating signal;

a first comparator means for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected;

a first duration obtaining means for receiving the state indicating signal, and obtaining and outputting a first duration in which the first condition continues;

a rapid fall detecting means for receiving the strength indicating signal, and for detecting a second condition in which the amplitude of the strength indicating signal decreases at a rate exceeding a predetermined decreasing rate;

a second duration determining means for determining a second duration in which transmission of said second radio frequency signal is to be stopped, based on said first duration;

a third comparator means for receiving a strength indicating signal, and comparing the amplitude of the strength indicating signal with a third reference voltage to detect a second time at which the amplitude of the strength indicating signal becomes below the third reference voltage; and a rapid fall condition detecting means for detecting the second condition by detecting a third condition in which the time difference from the first time to the second time is less than a predetermined time.

9. A message signal transmission control circuit according to claim 8, wherein the rapid fall detecting means comprises:

a second comparator means for receiving a strength indicating signal, and comparing the amplitude of the strength indicating signal with a second reference voltage to detect a first time at which the amplitude of the strength indicating signal becomes below the second reference voltage;

a third comparator means for receiving a strength indicating signal, and comparing the amplitude of the strength indicating signal with a third reference voltage to detect a second time at which the amplitude of the strength indicating signal becomes below the third reference voltage; and a rapid fall condition detecting means for detecting the second condition by detecting a third condition in which the time difference from the first time to the second time is less than a predetermined time.

10. A message signal transmission control circuit according to claim 9, further comprising a gate means for supplying the first duration obtained by the first duration obtaining means to the second duration determining means when receiving an active gate control signal;

the rapid fall detecting means further comprising a gate control signal generating means for generating the gate control signal to be supplied to the gate means when the rapid fall condition detecting means detects the third condition.

11. A mobile radio communication apparatus, comprising:

signal reception means for receiving a first radio frequency signal, and a signal transmission means for transmitting a second radio frequency signal;

a transmitting signal generating means for generating the second radio frequency signal to be transmitted through the antenna;

a transmission stopping means for stopping the operation of transmitting the second radio frequency signal when receiving a stop control signal;

a strength indicating signal generating means for receiving the radio frequency signal received by the antenna, and generating a strength indicating signal having an amplitude corresponding to a strength of an electric field received by the antenna, based on the received radio frequency signal;

a first comparator means for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected;

a first duration obtaining means for receiving the state indicating signal, and obtaining and outputting a first duration in which the first condition continues;

a rapid fall detecting means for receiving the strength indicating signal, and detecting a second condition in which the amplitude of the strength indicating signal decreases an a rate exceeding a predetermined decreasing rate;

a first duration storing means for storing the first duration obtained by the first duration obtaining means when the second condition is detected;

a second duration determining means for determining a second duration in which the operation of transmitting the second radio frequency signal is to be stopped, based on a plurality of values of the first duration where the plurality of values are successively obtained by the first duration obtaining means within a predetermined duration; and a stop control signal generating means for generating the stop control signal to be supplied to the transmission stopping means to stop the operation of transmitting the second radio frequency signal for the second duration when the second condition is detected.

12. A mobile radio communication apparatus according to claim 11, wherein the second duration determining means determines the second duration based on a largest value among the plurality of values of the first duration.

13. A mobile radio communication apparatus according to claim 12, wherein the second duration determining means determines the second duration by multiplying the largest value by a predetermined factor.

14. A mobile radio communication apparatus according to claim 11, wherein the second duration determining means determines the second duration based on a sum of the plurality of values of the first duration, 15. A mobile radio communication apparatus according to claim 11, wherein the second duration determining means determines the second duration based on an average of the plurality of values of the first duration.

16. A mobile radio communication apparatus according to claim 11, wherein the rapid fall detecting means comprises:

a second comparator means for receiving a strength indicating signal, and comparing the amplitude of the strength indicating signal with a second reference voltage to detect a first time at which the amplitude of the strength indicating signal becomes below the second reference voltage;

a third comparator means for receiving a strength indicating signal, and comparing the amplitude of the strength indicating signal with a third reference voltage to detect a second time at which the amplitude of the strength indicating signal becomes below the third reference voltage; and a rapid fall condition detecting means for detecting the second condition by detecting a third condition in which the time difference from the first time to the second time is less than a predetermined time.

17. A mobile radio communication apparatus according to claim 16, further comprising a gate means for supplying the first duration obtained by the first duration obtaining means to the first duration storing means when receiving an active gate control signal;

the rapid fall detecting means further comprising a gate control signal generating means for generating the gate control signal to be supplied to the gate means when the rapid fall condition detecting means detects the third condition.

18. A message signal transmission control circuit, comprising:

a strength indicating signal receiving means for receiving a strength indicating signal;

a first comparator means for receiving a strength indicating signal and comparing the amplitude of the strength indicating signal with a reference voltage to detect a first condition in which the amplitude of the strength indicating signal is below the reference voltage, to output a state indicating signal indicating whether or not the first condition is currently detected;

a first duration obtaining means for receiving the state indicating signal, and obtaining and outputting a first duration in which the first condition continues;

a rapid fall detecting means for receiving the strength indicating signal, and detecting a second condition in which the amplitude of the strength indicating signal decreases at a rate exceeding a predetermined decreasing rate;

a first duration storing means for storing the first duration obtained by the first duration obtaining means when the second condition is detected;

a second duration determining means for determining a second duration in which the operation of transmitting the second radio frequency signal is to be stopped, based on a plurality of values of the first duration where the plurality of values are successively obtained by the first duration obtaining means within a predetermined duration; and a stop control signal generating means for generating a stop control signal, and outputting the stop control signal for the second duration, when the second condition is detected.

19. A message signal transmission control circuit according to claim 18, wherein the second duration determining means determines the second duration based on a largest value among the plurality of values of the first duration.

20. A message signal transmission control circuit according to claim 19, wherein the second duration determining means determines the second duration by multiplying the largest value by a predetermined factor.

21. A message signal transmission control circuit according to claim 18, wherein the second duration determining means determines the second duration based on a sum of the plurality of values of the first duration.

22. A message signal transmission control circuit according to claim 18, wherein the second duration determining means determines the second duration based on an average of the plurality of values of the first duration.

23. A message signal transmission control circuit according to claim 18, wherein the rapid fall detecting means comprises:

a second comparator means for receiving a strength indicating signal, and comparing the amplitude of the strength indicating signal with a second reference voltage to detect a first time at which the amplitude of the strength indicating signal becomes below the second reference voltage;

a third comparator means for receiving a strength indicating signal, and comparing the amplitude of the strength indicating signal with a third reference voltage to detect a second time at which the amplitude of the strength indicating signal becomes below the third reference voltage; and a rapid fall condition detecting means for detecting the second condition by detecting a third condition in which the time difference from the first time to the second time is less than a predetermined time.

24. A message signal transmission control circuit according to claim 23, further comprising a gate means for supplying the first duration obtained by the first duration obtaining means to the second duration determining means when receiving an active gate control signal;

the rapid fall detecting means further comprising a gate control signal generating means for generating the gate control signal to be supplied to the gate means when the rapid fall condition detecting means detects the third condition.

25. A mobile radio communication apparatus, comprising:

signal reception means for receiving a first radio frequency signal, and a signal transmission means for transmitting a second radio frequency signal;

a transmitting signal generating means for generating the second radio frequency signal to be transmitted through the antenna;

a transmission stopping means for stopping the operation of transmitting the second radio frequency signal when receiving a stop control signal;

a strength indicating signal generating means for receiving the radio frequency signal received by the antenna, and generating a strength indicating signal having an amplitude corresponding to a strength of an electric field received by the antenna, based on the received radio frequency signal;

a first comparator means for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected;

a first duration obtaining means for receiving the state indicating signal, and obtaining and outputting a first duration in which the first condition continues;

a first duration storing means for storing the first duration obtained by the first duration obtaining means;

a second duration determining means for determining a second duration in which the operation of transmitting the second radio frequency signal is to be stopped, based on a plurality of values of the first duration where the plurality of values are successively obtained by the first duration obtaining means within a predetermined duration; and a stop control signal generating means for generating the stop control signal to be supplied to the transmission stopping means to stop the operation of transmitting the second radio frequency signal for the second duration when the first condition is detected.

26. A mobile radio communication apparatus according to claim 25, wherein the second duration determining means determines the second duration based on a largest value among the plurality of values of the first duration.

27. A mobile radio communication apparatus according to claim 26, wherein the second duration determining means determines the second duration by multiplying the largest value by a predetermined factor.

28. A mobile radio communication apparatus according to claim 25, wherein the second duration determining means determines the second duration based on a sum of the plurality of values of the first duration.

29. A mobile radio communication apparatus according to claim 25, wherein the second duration determining means determines the second duration based on an average of the plurality of values of the first duration.

30. A message signal transmission control circuit, comprising:
   a strength indicating signal receiving means for receiving a strength indicating signal;
   a first comparator means for receiving a strength indicating signal, and comparing the amplitude of the strength indicating signal with a reference voltage to detect a first condition in which the amplitude of the strength indicating signal is below the reference voltage, to output a state indicating signal indicating whether or not the first condition is currently detected;
   a first duration obtaining means for receiving the state indicating signal, and obtaining and outputting a first duration in which the first condition continues;
   a first duration storing means for storing the first duration obtained by the first duration obtaining means;
   a second duration determining means for determining a second duration in which the operation of transmitting the second radio frequency signal is to be stopped, based on a plurality of values of the first duration where the plurality of values are successively obtained by the first duration obtaining means within a predetermined duration; and
   a stop control signal generating means for generating a stop control signal and outputting the stop control signal for the second duration when the first condition is detected.

31. A message signal transmission control circuit according to claim 30, wherein the second duration determining means determines the second duration based on a largest value among the plurality of values of the first duration.

32. A message signal transmission control circuit according to claim 31, wherein the second duration determining means determines the second duration by multiplying the largest value by a predetermined factor.

33. A message signal transmission control circuit according to claim 30, wherein the second duration determining means determines the second duration based on a sum of the plurality of values of the first duration.

34. A message signal transmission control circuit according to claim 30, wherein the second duration determining means determines the second duration based on an average of the plurality of values of the first duration.

* * * * *